US010048883B2

(12) United States Patent
Suman et al.

(10) Patent No.: US 10,048,883 B2
(45) Date of Patent: Aug. 14, 2018

(54) INTEGRATED PAGE-SHARING CACHE STORING A SINGLE COPY OF DATA WHERE THE DATA IS STORED IN TWO VOLUMES AND PROPAGATING CHANGES TO THE DATA IN THE CACHE BACK TO THE TWO VOLUMES VIA VOLUME IDENTIFIERS

(71) Applicant: Dell Products, LP, Round Rock, TX (US)

(72) Inventors: Daniel E. Suman, Chapel Hill, NC (US); Jason C. Shamberger, Groton, MA (US); Lazarus J. Vekiarides, West Roxbury, MA (US)

(73) Assignee: Dell Products, LP, Round Rock, TX (US)

( * ) Notice: Subject to any disclaimer, the term of this patent is extended or adjusted under 35 U.S.C. 154(b) by 373 days.

(21) Appl. No.: 14/499,765

(22) Filed: Sep. 29, 2014

(65) Prior Publication Data

US 2016/0092356 A1 Mar. 31, 2016

(51) Int. Cl.
*G06F 3/06* (2006.01)
*G06F 12/08* (2016.01)
*G06F 12/0873* (2016.01)

(52) U.S. Cl.
CPC ............ *G06F 3/0641* (2013.01); *G06F 3/067* (2013.01); *G06F 3/0611* (2013.01); *G06F 12/0873* (2013.01); *G06F 2212/1016* (2013.01); *G06F 2212/1041* (2013.01); *G06F 2212/281* (2013.01); *G06F 2212/313* (2013.01)

(58) Field of Classification Search
CPC combination set(s) only.
See application file for complete search history.

(56) References Cited

U.S. PATENT DOCUMENTS

| 5,666,515 | A * | 9/1997 | White | G06F 12/1425 710/200 |
| 2003/0028724 | A1* | 2/2003 | Kedem | G06F 3/061 711/113 |
| 2008/0195807 | A1* | 8/2008 | Kubo | G06F 12/126 711/114 |
| 2010/0070715 | A1* | 3/2010 | Waltermann | G06F 12/0868 711/129 |
| 2011/0173401 | A1* | 7/2011 | Usgaonkar | G06F 3/0608 711/162 |
| 2012/0159081 | A1* | 6/2012 | Agrawal | G06F 12/0866 711/141 |

(Continued)

OTHER PUBLICATIONS

Flash Technologies. White Paper [online]. M-Systems, Oct. 2002 [retrieved on Jun. 9, 2016]. Retrieved from the Internet <https://focus.ti.com/pdfs/omap/diskonchipvsnor.pdf>.*

(Continued)

*Primary Examiner* — Daniel Tsui
*Assistant Examiner* — Chie Yew
(74) *Attorney, Agent, or Firm* — Hamilton, Brook, Smith & Reynolds, P.C.

(57) ABSTRACT

In an embodiment, a method can include storing a plurality of volumes on persistent media. A set of the volumes can store at least one portion of a same copy of data. The method can further include caching the set of the volumes as a single group. In an embodiment, the plurality of volumes can include at least one of drives, snapshots, clones and replicas.

9 Claims, 8 Drawing Sheets

(56) References Cited

U.S. PATENT DOCUMENTS

2014/0201489 A1* 7/2014 Deguchi ............ G06F 12/0246
                                              711/170

OTHER PUBLICATIONS

Partition. Definition [online]. Microsoft, 2013 [retrieved on Jun. 14, 2016]. Retrieved from the Internet <https://web.archive.org/web/20130714060158/http://windows.microsoft.com/en-us/windows/create-format-hard-disk-partition#create-format-hard-disk-partition=windows-vista>.*
Dell EqualLogic PS Series, "Inside the Dell EqualLogic PS Series iSCSI storage arrays" 2010.

* cited by examiner

| PAGE | VOLUME | PHYSICAL LOCATION | CACHE LOCATION |
|---|---|---|---|
| A | 1 | 0X0000 | 0X00 |
| A | 2 | 0XAF00 | 0X00 |
| A | 3 | 0X1600 | 0X00 |
| B | 1 | 0X1500 | 0X01 |
| B | 2 | 0XBC00 | 0X01 |
| B | 3 | 0X9700 | 0X01 |
| ... | ... | ... | ... |
| Z | 3 | 0XDE00 | 0XFF |

INTEGRATED PAGE-SHARING CACHE STORING A SINGLE COPY OF DATA WHERE THE DATA IS STORED IN TWO VOLUMES AND PROPAGATING CHANGES TO THE DATA IN THE CACHE BACK TO THE TWO VOLUMES VIA VOLUME IDENTIFIERS

BACKGROUND

Storage systems, such as persistent media, can employ a cache subsystem to increase reading and writing speeds. A cache subsystem can employ a smaller and faster memory to store recently read data for faster recall, based on the assumption that recently read data is more likely than random data from the storage system to be read again. Therefore, the cache improves the speed of reading and writing to frequently accessed data of the storage system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In an embodiment, a method can include storing a plurality of volumes on persistent media. A set of the volumes can store at least one portion of a same copy of data. The method can further include caching the set of the volumes as a single group.

In an embodiment, the plurality of volumes can include at least one of drives, snapshots, clones and replicas.

In an embodiment, the method can include maintaining, in a memory, a relationship between each of the plurality of volumes. The method can also include grouping the plurality of volumes into the set of the volumes based on a similarity of data within each of the plurality of volumes.

In an embodiment, caching the set of the volumes as the single group can include mapping the at least one portion of the volumes with the same copy to a same location in the cache. Mapping the volumes with the same copy to the same location in the cache can include updating a page sharing table of the plurality of volumes.

In an embodiment, an information handling system (IHS) can include a storage module configured to store a plurality of volumes on persistent media. A set of the volumes can store a same copy of data. The system can further include a caching module configured to cache the set of the volumes as a single group.

In an embodiment, a non-transitory computer-readable medium can be configured to store instructions. The instructions, which when loaded and executed by a processor can cause the processor to store a plurality of volumes on persistent media. A set of the volumes storing at least one portion of a same copy of data. The instructions can further cause the processor to cache the set of the volumes as a single group.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
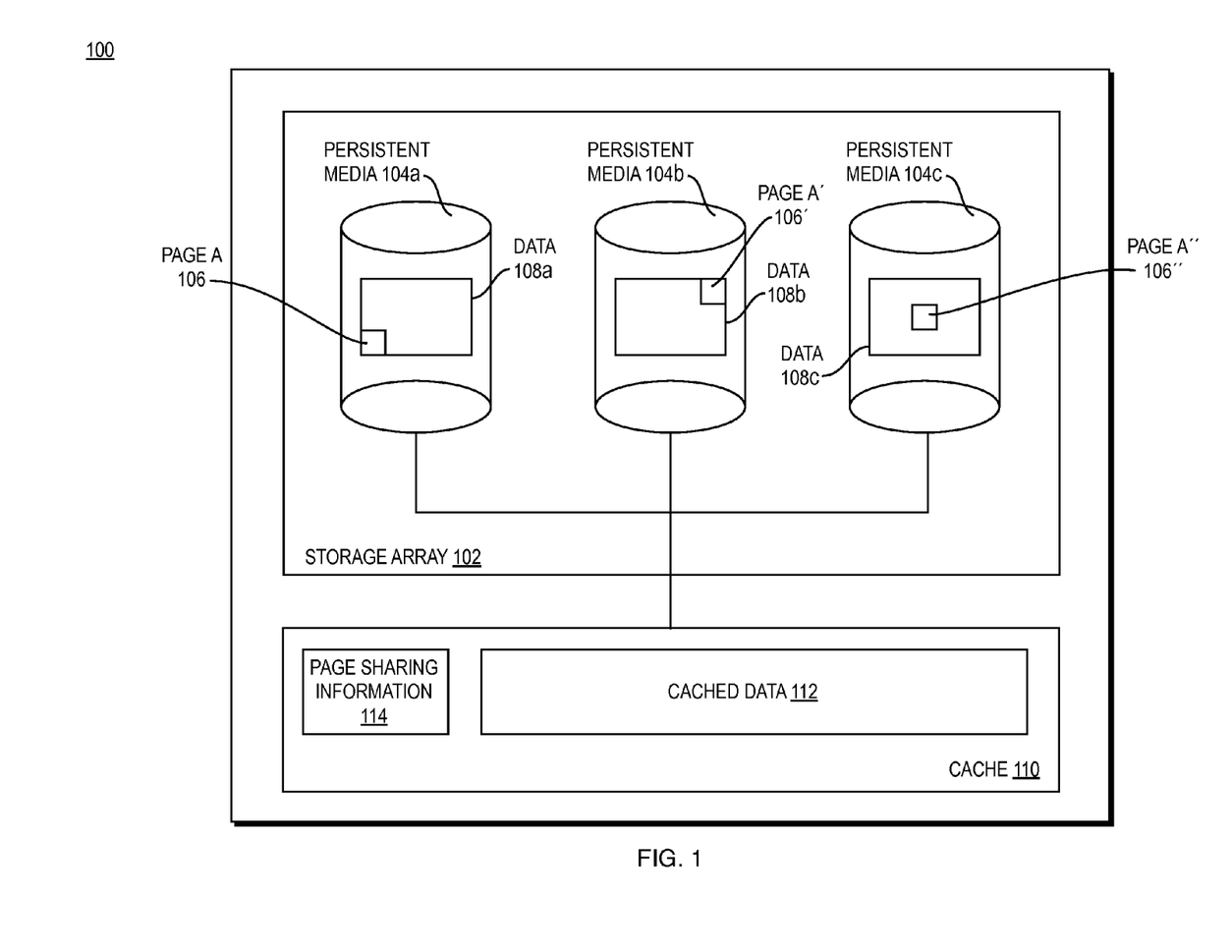
FIG. 1 is a block diagram illustrating an example embodiment of the present invention.

FIG. 1 is a block diagram 100 illustrating an example embodiment of the present invention. A storage array 102 is coupled with a cache 110. The storage array 102 includes a plurality of persistent media 104a-c. Each persistent media 104a-c can be a hard drive, solid-state drive, snapshot, clone, or replica. Further, the persistent media 104a-c stores data 108a-c, respectively, which stores pages 106. For example, data 108a-c stores page A 106, page A' 106', and page A" 106" respectively. Pages A 106, A' 106', and A" 106" store at least some of the same data, however, the data can be stored in different locations across the different persistent media 104a-c. For example, each persistent media 104a-c can store the Pages A 106, A' 106', and A" 106", all of which store the same data, even though other pages on each of the persistent media 104a-c may be different, and Pages A 106, A' 106', and A" 106" can be stored in different locations.

The storage array 102 is coupled to a cache 110. The cache 110 is operatively coupled to send and receive data to each of the persistent media 104a-c. The cache 110 is also operatively coupled to a memory that stores page sharing information 114. The page sharing information 114 can be stored within the cache 110, or be stored in a memory outside of the cache 110. Whether the page sharing information 114 is stored within or outside of the cache 110, the page sharing information on 114 is accessible to the cache 110 and/or a cache controller of the cache 110. The page sharing information 114 stores locations of the pages, such as page A 106, A' 106', and A" 106". The page sharing information 114 also can store information correlating the location of a page stored in persistent media 104a-c to corresponding entries in the cache 110 storing the same page. Giving the cache access to the page sharing information 114 can prevent duplication of the same page stored on different persistent media 104a-c in the cache 110. For example, one entry in the cache 110 can be used to store a page stored in one or more persistent media 104a-c. In previous solutions, with a cache not operatively configured to access page sharing information 114, the cache stores multiple copies of the same page that is stored across different persistent media. This is inefficient because the cache could use the space replicating the page to store other pages if it were aware that it stored duplicated information and had the ability to reference the same cache entry to multiple pages.

In the present invention, however, the cache 110 stores one copy of each page 106, 106', and 106", regardless of how many times the pages 106, 106', 106" are duplicated across the persistent media 104a-c. The cache leverages the page sharing information 114 to be aware of where each page 106, 106', and 106" that is stored in the cache 110 maps to the various persistent media 104a-c.

Figure 2:
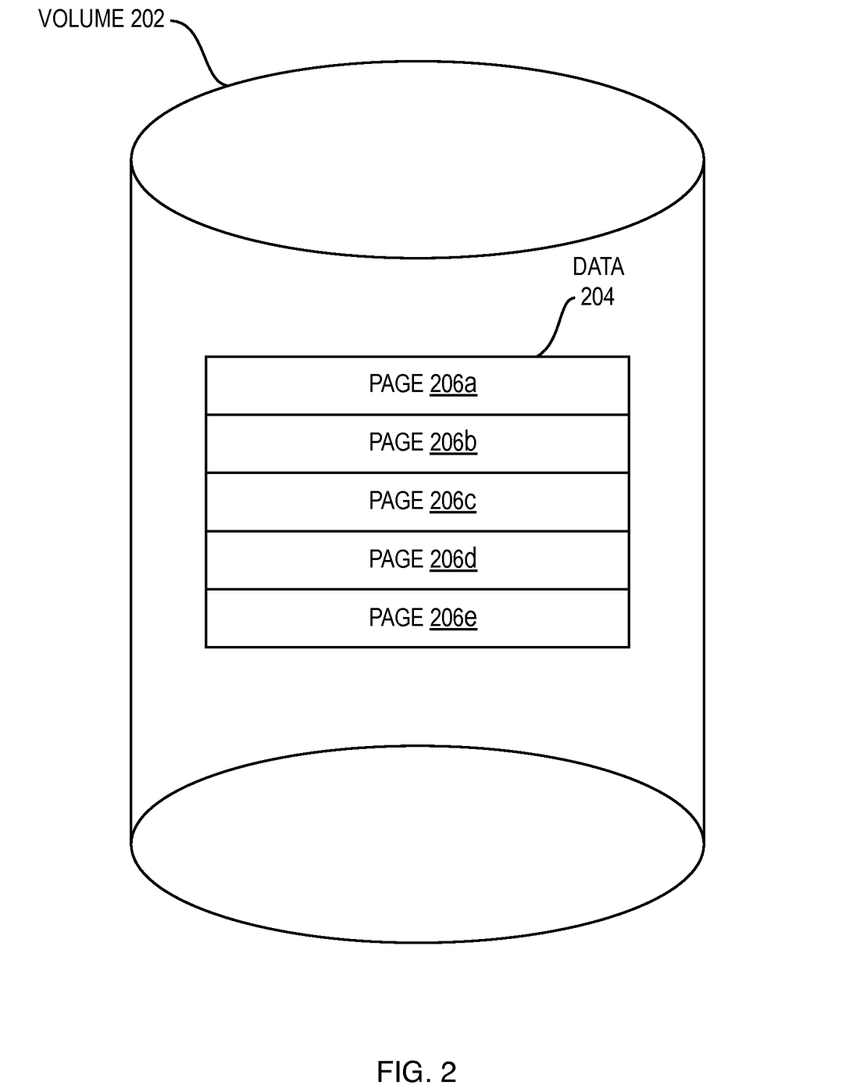
FIG. 2 is a block diagram illustrating an example embodiment of a volume, such as persistent media, and data stored therein.

FIG. 2 is a block diagram 200 illustrating an example embodiment of a volume 202, such as persistent media, and data 204 stored therein. The data 204 includes pages 206a-e. A page is a particular size of data stored within the volume 202. The cache 110, as shown in FIG. 1, caches data in units of pages, however, in other embodiments a cache can store data in units other than pages.

Figure 3:
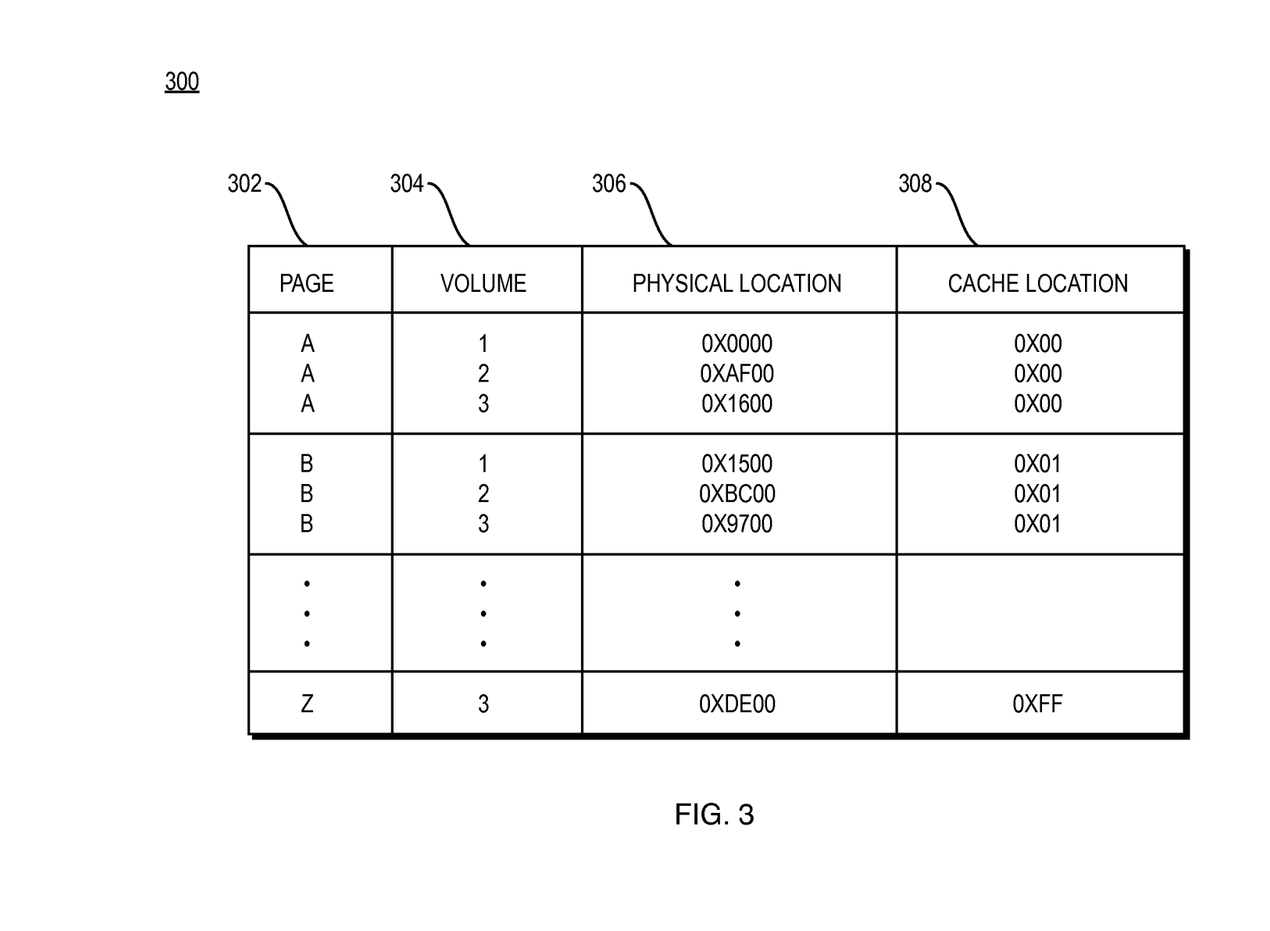
FIG. 3 is a table illustrating an example embodiment of page sharing information.

FIG. 3 is a table 300 illustrating an example embodiment of page sharing information. While FIG. 3 shows the page sharing information as a table, a person of ordinary skill in the art can implement the page sharing information in a variety of memory structures.

The page sharing table 300 includes columns for a page identifier 302, a volume identifier 304, a volume physical location 306 of the page, and a cache physical location 308 of the page (stored in the cache). As an example, page A is duplicated three times across volumes 304 1, 2, and 3. The physical locations 306 of the volumes 1, 2, and 3 can vary, as shown in FIG. 3. However, the cache physical location 308 is the same because the cache only stores one copy of the page. Page B has the same characteristics as page A as described above, however, it is stored at a different cache physical location 308. The page sharing table 300 can store information about any number of pages stored in the cache or in the persistent media. The last entry shown in FIG. 3, however, is an entry for page Z shown to be stored in volume 3 at a different physical cache location 308 than pages A and B.

Upon a write request, the page sharing table 300 can be utilized to locate a page in the cache. If the page is not in the cache, a new entry can be created after it is located in the cache, with each physical location of the page also being added to the table 300. Further, when the cache is about to delete the page from the cache, and therefore update the persistent media, the cache can access the table 300 and copy the updates in the cache to each of the corresponding physical locations of the page.

Figure 4:
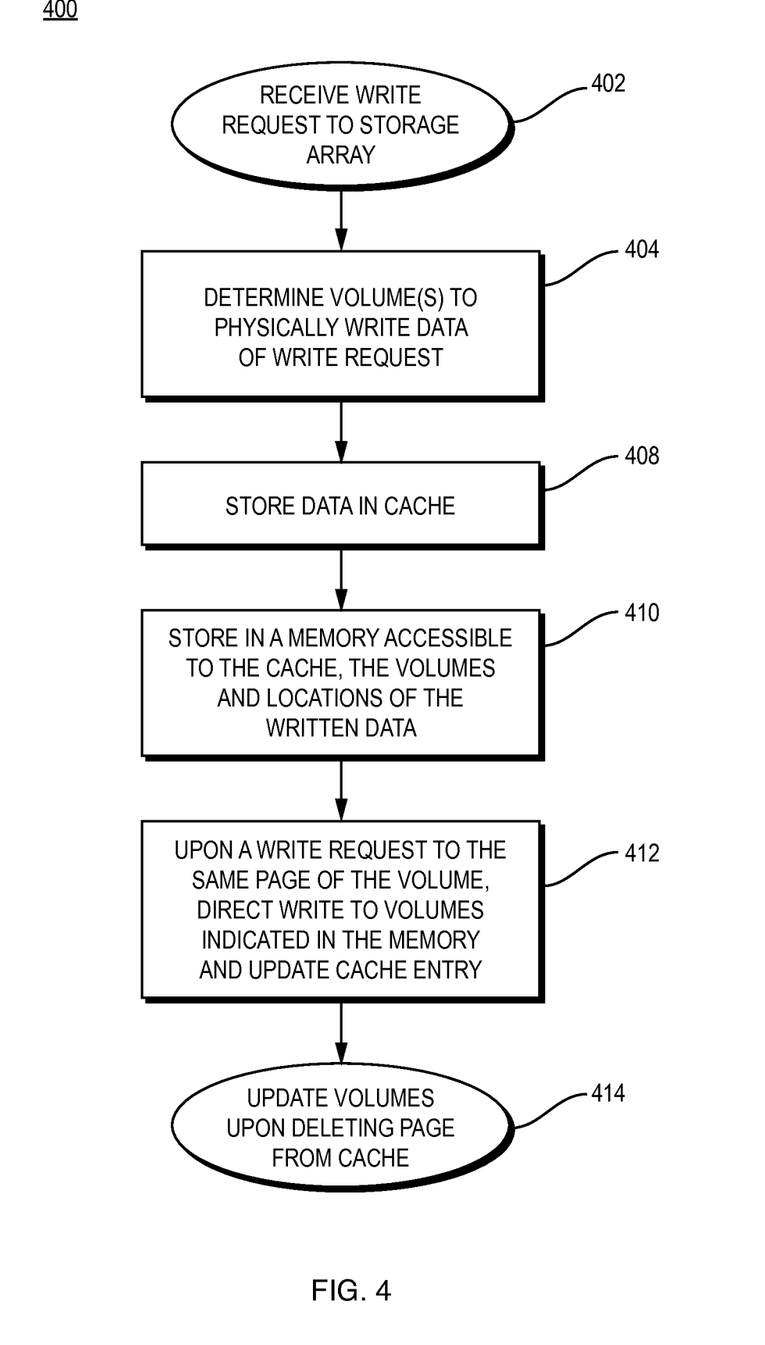
FIG. 4 is a flow diagram illustrating an example embodiment of the present invention.

FIG. 4 is a flow diagram 400 illustrating an example embodiment of the present invention. The process receives a write request to a storage array (402). The storage array can include persistent media, such as hard drives, solid state drives, replicas, and/or clones. The persistent media can also include snapshots. The method then determines volumes to physically write data of the write request (404). The determination can be made, for example, by determining which page the write request is directed towards. The system can then access the table, such as the table shown in FIG. 3, to determine which volumes store copies of the targeted page.

The method then stores the data in the cache (408). The method stores, in a memory accessible to the cache, the volumes and locations of the written data (410). For example, the method can store the location the page is written to in the cache. The method can write this location into a preexisting page table entry that describes the physical location of the page in each physical media. The method can then, upon a write request to the same page of the volume, direct the write to volumes indicated in the memory and update the cache entry (412). Then, the method can update volumes upon deleting the page from the cache (414).

Figure 5:
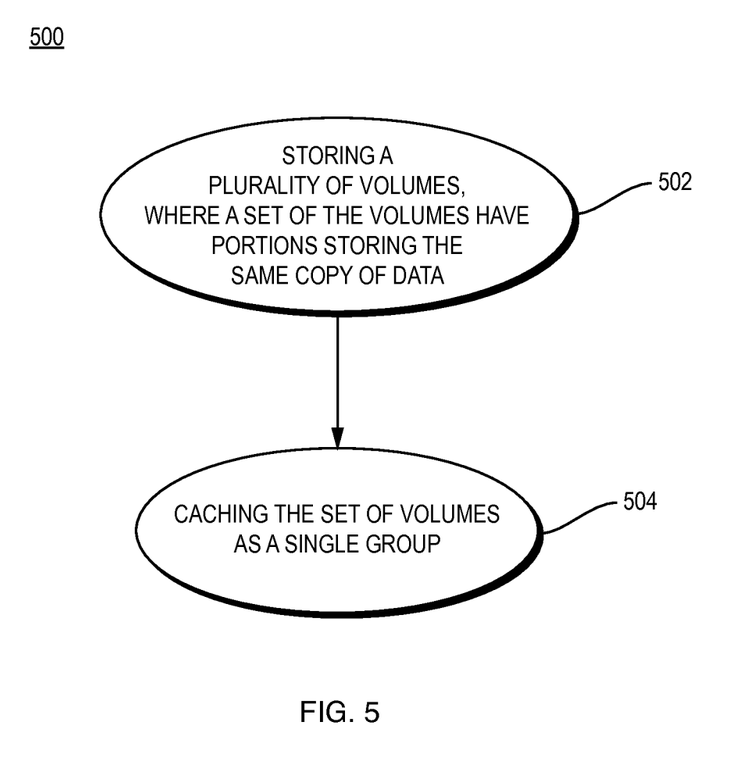
FIG. 5 is a flow diagram illustrating an embodiment of the present invention.

FIG. 5 is a flow diagram 500 illustrating an embodiment of the present invention. First, the method stores a plurality of volumes, where a set of the volumes have portions storing the same copy of the data (502). Then, the method caches the set of volumes as a single group (504).

Figure 6:
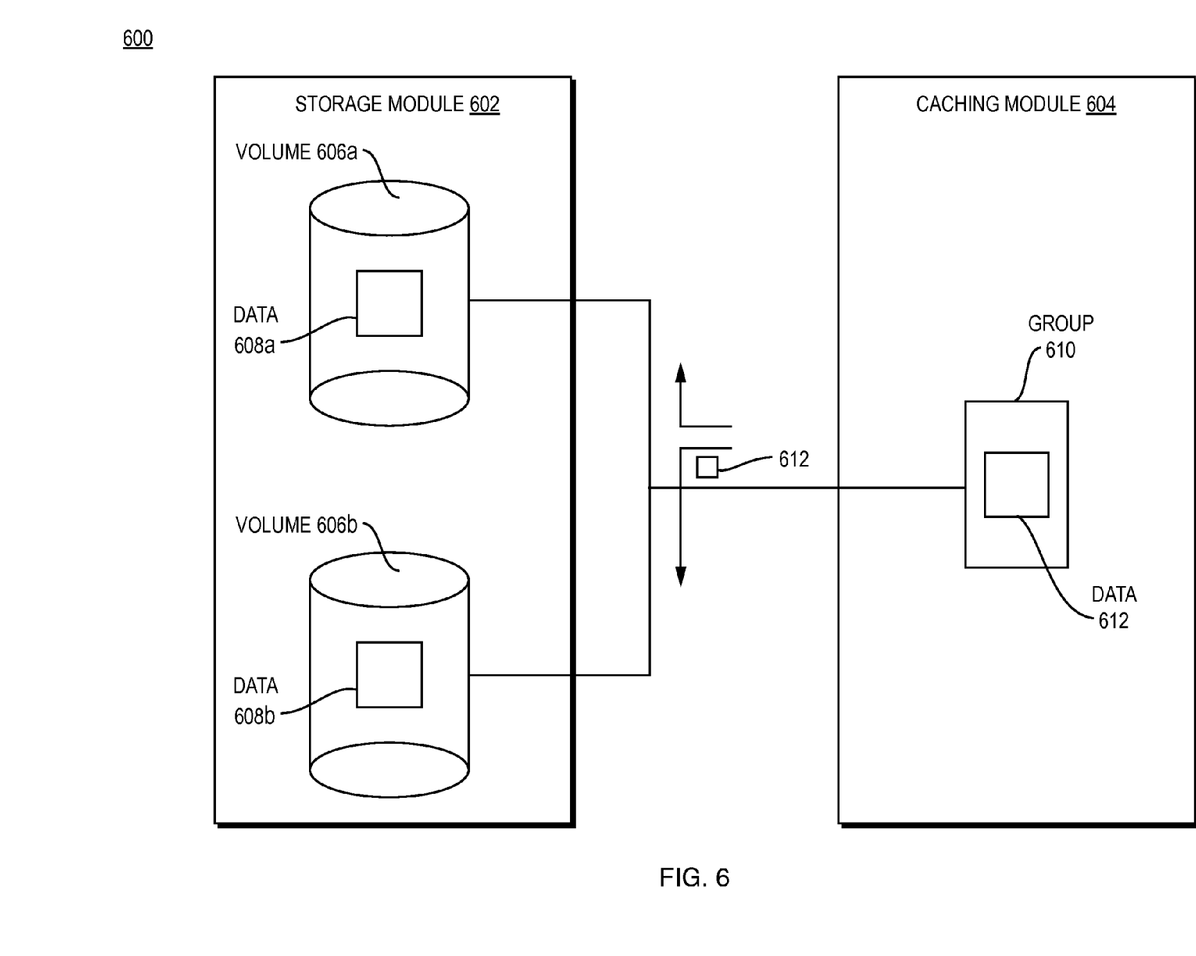
FIG. 6 is a block diagram illustrating an example embodiment of the present invention.

FIG. 6 is a block diagram 600 illustrating an example embodiment of the present invention. The present invention includes a storage module 602 and a caching module 604. The storage module 602 includes volumes 606a-b, which each store data 608a-b, respectively. The caching module 604 stores a group 610 storing data 612, which can correspond to pages of the volumes 606a-b. The pages of the volumes 606a-b can store page data 608a-b. Upon the data 612 expiring from the cache, the caching module 604 sends data 612 to volumes 606a-b to be stored in the correct page.

Figure 7:
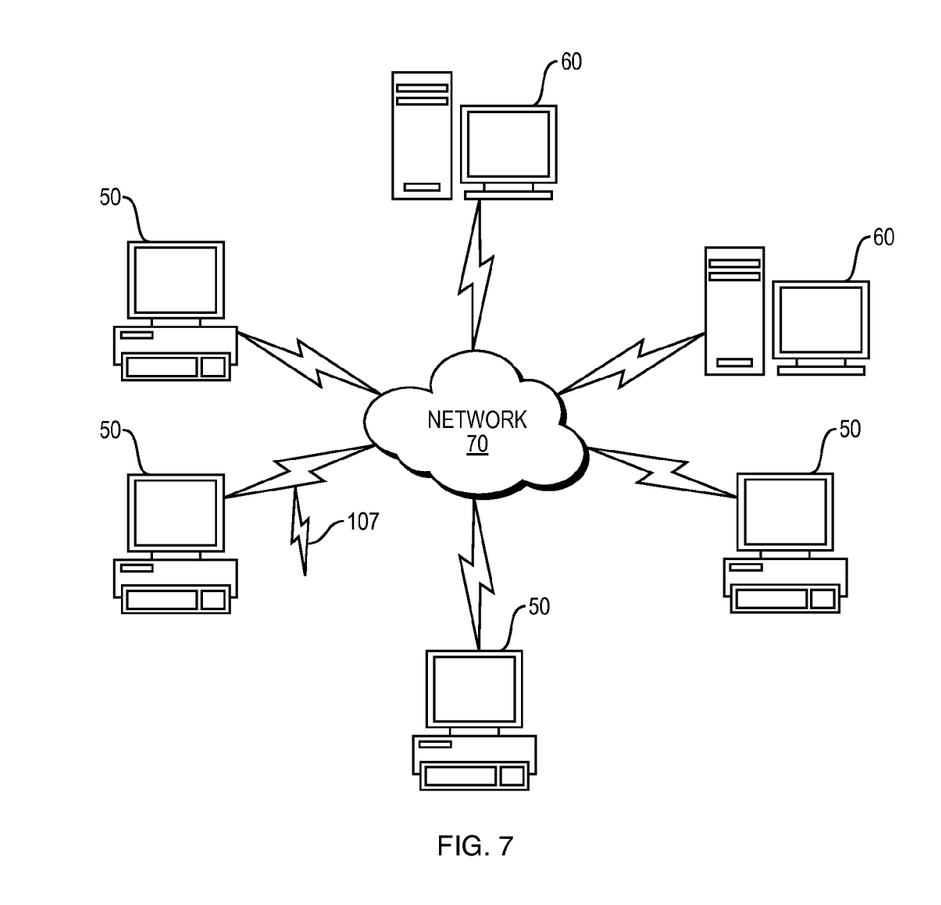
FIG. 7 is a simplified diagram of a computer network environment in which an embodiment of the present invention may be implemented.

FIG. 7 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 8:
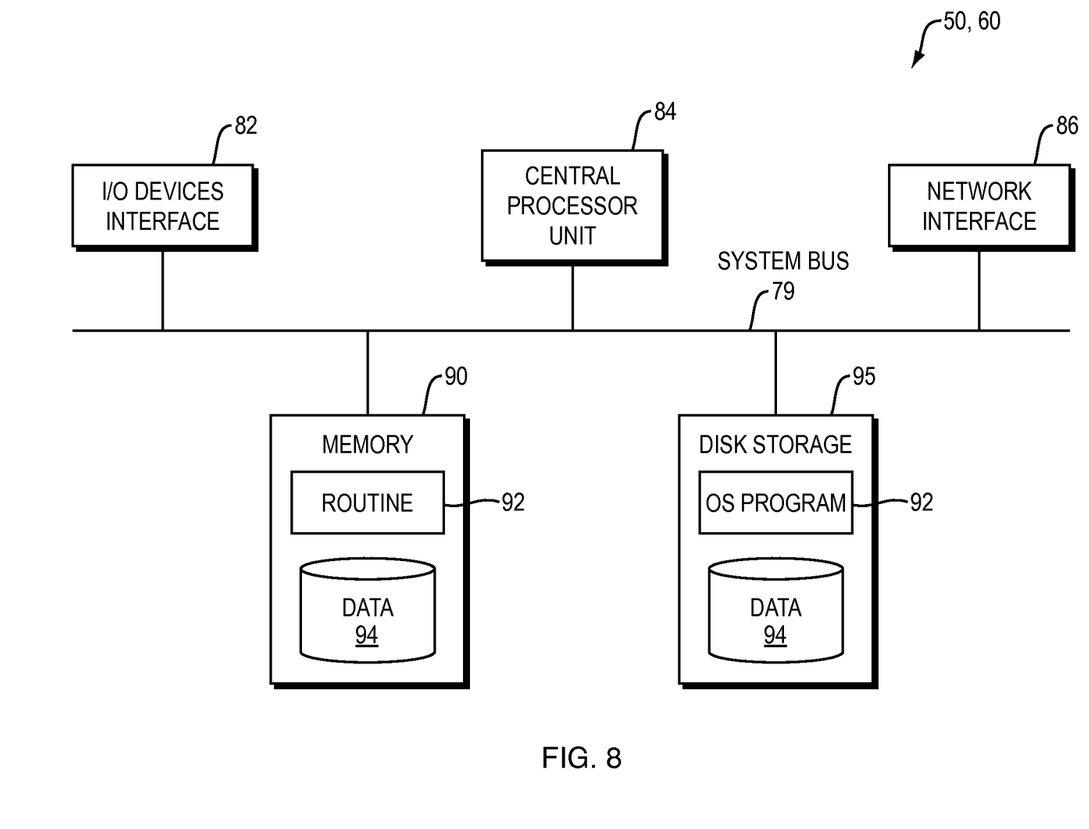
FIG. 8 is a diagram of a computer system in which an embodiment of the present invention may be embodied.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present invention (e.g., storage module and caching module code detailed above). Disk storage 95 provides non-volatile storage for computer software instructions 92 and data 94 used to implement an embodiment of the present invention. A central processor unit 84 is also attached to the system bus 79 and provides for the execution of computer instructions. The disk storage 95 or memory 90 can provide storage for a database. Embodiments of a database can include a SQL database, text file, or other organized collection of data.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded 107 over a cable communication and/or wireless connection.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
storing at least one page of data in a first volume of a plurality of physical volumes on persistent media and storing the at least one page of data in a second physical volume of the plurality of volumes;
caching the same copy of the both the at least one page of data of the first physical volume and the at least one page of data of the second physical volume of the plurality of the volumes as a single group by:
storing the same copy of the at least one page of data in a single location in a cache, and
indexing the single location in the cache storing the at least one page of data to (a) a first volume identifier of the first volume, (b) a second volume identifier of the second volume, (c) a first location identifier of a location in the first volume storing the at least one page of data and (d) a second location identifier of a location in the second volume storing the at least one page of data; and in response to a write request, (a) updating the at least one page of data in the single location in the cache, (b) determining a set of volumes of the plurality of volumes to direct the write request by identifying the first volume according to the first volume identifier and identifying the second volume according to the second volume identifier, and (c) after the updating, writing the at least one page of data in the single location in the cache to the location in the first volume according to the first location identifier and, after the updating, writing the at least one page of data in the single location in the cache to the location in the second volume according to the second location identifier.

2. The method of claim 1, wherein the plurality of volumes includes at least one of drives, snapshots, and clones.

3. The method of claim 1, wherein indexing includes updating a page sharing table of the plurality of volumes.

4. An information handling system (IHS) comprising:
a storage module configured to store at least one page of data in a first volume of a plurality of volumes on persistent media and further configured to store the at least one page of data in a second volume of the plurality of volumes; and
a cache configured to cache both the at least one page of data of the first volume and the at least one page of data of the second volume of the plurality of volumes as a single group by:
storing the at least one page of data in a single location in the cache,
indexing the single location in the cache storing the at least one page of data to (a) a first volume identifier of the first volume, (b) a second volume identifier of the second volume, (c) a first location identifier of a location in the first volume storing the at least one page of data and (d) a second location identifier of a location in the second volume storing the at least one page of data; and in response to a write request, (a) update the at least one page of data in the single location in the cache, (b) determine a set of volumes of the plurality of volumes to direct the write request by identifying the first volume according to the first volume identifier and identifying the second volume according to the second volume identifier, and (c) after the update, writing the at least one page of data in the single location in the cache to the location in the first volume according to the first location identifier and, after the update, writing the at least one page of data in the single location in the cache to the location in the second volume according to the second location identifier.

5. The IHS of claim 4, wherein the plurality of volumes includes at least one of drives, snapshots, and clones.

6. The HIS of claim 4, wherein the cache is further configured to update a page sharing table of the plurality of volumes.

7. A non-transitory computer-readable medium configured to store instructions, which when loaded and executed by a processor cause the processor to:

store at least one page of data in a first volume of a plurality of volumes on persistent media and store the at least one page of data in a second volume of the plurality of volumes;

cache both the at least one page of data of the first volume and the at least one page of data of the second volume of the plurality of volumes as a single group by:

storing the at least one page of data in a single location in a cache, and indexing the single location in the cache storing the at least one page of data to (a) a first volume identifier of the first volume, (b) a second volume identifier of the second volume, (c) a first location identifier of a location in the first volume storing the at least one page of data, (d) a second location identifier of a location in the second volume storing the at least one page of data; and in response to a write request, (a) update the at least one page of data in the single location in the cache, (b) determine a set of volumes of the plurality of volumes to direct the write request by identifying the volume according to the first volume identifier and identifying the second volume according to the second volume identifier, and (c) after the update, direct the at least one page of data in the single location in the cache to the location in the first volume according to the first location identifier and, after the update, write the at least one page of data in the single location in the cache to the location in the second volume according to the second location identifier.

8. The non-transitory computer-readable medium of claim 7, wherein the plurality of volumes includes at least one of drives, snapshots, and clones.

9. The non-transitory computer-readable medium of claim 7, wherein the instructions further cause the processor to update a page sharing table of the plurality of volumes.

* * * * *

UNITED STATES PATENT AND TRADEMARK OFFICE
CERTIFICATE OF CORRECTION

PATENT NO. : 10,048,883 B2  
APPLICATION NO. : 14/499765  
DATED : August 14, 2018  
INVENTOR(S) : Suman et al.

Page 1 of 1

It is certified that error appears in the above-identified patent and that said Letters Patent is hereby corrected as shown below:

In the Claims

In Column 5, Line 56, Claim 1, delete "physical"

In Column 5, Line 57, Claim 1, delete "physical"

In Column 5, Line 59, Claim 1, delete "the same copy of the"

In Column 5, Line 60, Claim 1, delete "physical"

In Column 5, Line 61, Claim 1, delete "physical"

In Column 5, Line 63, Claim 1, delete "the same copy of"

In Column 6, Line 62, Claim 6, delete "HIS" and replace it with --IHS--

Signed and Sealed this  
Twenty-fifth Day of September, 2018

Andrei Iancu  
*Director of the United States Patent and Trademark Office*